(12) United States Patent
Nakashima et al.

(10) Patent No.: US 10,338,087 B2
(45) Date of Patent: Jul. 2, 2019

(54) PHOTOELECTRIC SENSOR

(71) Applicant: OMRON Corporation, Kyoto (JP)

(72) Inventors: Hirotaka Nakashima, Fukuchiyama (JP); Kazunari Komai, Kameoka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/132,494

(22) Filed: Sep. 17, 2018

(65) Prior Publication Data

US 2019/0101561 A1    Apr. 4, 2019

(30) Foreign Application Priority Data

Oct. 2, 2017  (JP) ................................. 2017-192862

(51) Int. Cl.
| | | |
|---|---|---|
| *G02B 27/09* | (2006.01) | |
| *G01P 1/02* | (2006.01) | |
| *G01V 8/12* | (2006.01) | |
| *G06F 3/048* | (2013.01) | |
| *G01P 1/08* | (2006.01) | |

(52) U.S. Cl.
CPC ................. *G01P 1/02* (2013.01); *G01V 8/12* (2013.01); *G01P 1/08* (2013.01); *G06F 3/048* (2013.01)

(58) Field of Classification Search
CPC .............................. G01S 7/4813; G01J 1/0271
USPC ...................... 250/221, 239, 559.38; 340/555
See application file for complete search history.

(56) References Cited

U.S. PATENT DOCUMENTS

| | | | | | |
|---|---|---|---|---|---|
| 4,021,665 | A | * | 5/1977 | Haas ........................ | H01L 31/16 250/239 |
| 4,217,492 | A | * | 8/1980 | Fayfield ................... | H05K 5/03 250/239 |
| 4,282,430 | A | * | 8/1981 | Hatten ..................... | G01C 3/10 250/221 |
| 4,990,768 | A | * | 2/1991 | Ito ............................ | G01V 8/12 250/239 |
| 6,642,510 | B1 | * | 11/2003 | Sugiyama ............. | G01S 7/4813 250/221 |

(Continued)

FOREIGN PATENT DOCUMENTS

| | | |
|---|---|---|
| DE | 29810418 | 10/1998 |
| JP | H05167413 | 7/1993 |
| JP | 2011077050 | 4/2011 |

OTHER PUBLICATIONS

"Search Report of Europe Counterpart Application", dated Mar. 7, 2019, p. 1-p. 7.

*Primary Examiner* — Anthony Q Edwards
(74) *Attorney, Agent, or Firm* — JCIPRNET

(57) ABSTRACT

A housing of a photoelectric sensor has a front surface having a light projecting/receiving surface, a rear surface, a top surface adjacent to the front surface and extending in a direction orthogonal to the front surface and the rear surface, and an inclined surface inclined with respect to and connecting the top surface and the rear surface. On the top surface, a teach button that receives an input operation from outside to set a threshold value and an indicator that displays a detection result of the object being detected are provided in order from the side of the inclined surface. On the inclined surface, an adjustment button that receives an input operation from outside to finely adjust the threshold value is provided. A distance between the teach button and the adjustment button is larger than a distance between the teach button and the indicator.

8 Claims, 5 Drawing Sheets

(56) References Cited

U.S. PATENT DOCUMENTS

| | | | |
|---|---|---|---|
| 7,022,979 B2* | 4/2006 | Sugiyama | G01S 7/4813 |
| | | | 250/221 |
| 7,053,786 B2 | 5/2006 | Sugiyama | |
| 7,417,217 B2* | 8/2008 | Deguchi | G01V 8/14 |
| | | | 250/214 SW |
| 9,217,666 B2* | 12/2015 | Uozumi | G01J 1/44 |
| 2006/0279867 A1 | 12/2006 | Deguchi et al. | |
| 2015/0108376 A1* | 4/2015 | Kawaguchi | G02B 27/09 |
| | | | 250/559.38 |
| 2017/0253369 A1* | 9/2017 | Mizusaki | G01D 11/26 |
| 2017/0254700 A1* | 9/2017 | Mizusaki | G01J 1/44 |

* cited by examiner

PHOTOELECTRIC SENSOR

CROSS-REFERENCE TO RELATED APPLICATION

This application claims the priority of Japan patent application serial no. 2017-192862, filed on Oct. 2, 2017. The entirety of the above-mentioned patent application is hereby incorporated by reference herein and made a part of this specification.

BACKGROUND

Technical Field

The disclosure relates to a photoelectric sensor.

Description of Related Art

Photoelectric sensors have various detection methods and configurations so as to correspond to various detection environments and installation sites. For example, in terms of configurations, the photoelectric sensors are categorized into a built-in amplifier type with a built-in amplifier in the sensor head and an amplifier separate type in which the sensor head and the amplifier are separated. In recent years, due to adaptation to robotization and diversification of work according to taste diversity, etc., a distance-settable built-in amplifier type photoelectric sensor capable of detecting a longer distance is required, and the photoelectric sensor that displays the value of the distance to the object being detected is also known.

For example, in the distance-settable built-in amplifier type photoelectric sensor described in Patent Document 1 (Japanese Laid-Open No. 2011-077050), a light projecting/receiving part is provided on the front surface of a rectangular parallelepiped shaped housing, a display part and two adjusting switches are provided on the rear surface, also an indicator and a selection/decision/setting switch are provided on the upper surface orthogonal to the front surface and the rear surface. As for the photoelectric sensor, when the user sets/adjusts a threshold value, the selection/decision/setting switch is pressed first. Then, a certain threshold value is automatically set. Next, the user finely adjusts the threshold value by pressing the adjustment switch while viewing the display part.

However, in the photoelectric sensor of Patent Document 1, the arrangement of the selection/decision/setting switch and the adjustment switch is divided into two vertical surfaces, giving the user a feeling that it is difficult to set/adjust a threshold value. On the other hand, if all of the selection/decision/setting switch, the adjustment switch, the indicator, and the display part are arranged on one surface, such as the rear surface, operability can be ensured. However, in that case, it is difficult to miniaturize the photoelectric sensor. Also, as there is a demand to improve sealability of various parts of the photoelectric sensor, it is necessary to devise an arrangement of disposing every switch and realize both miniaturization and sealability of the photoelectric sensor.

SUMMARY

According to an embodiment of the disclosure, a photoelectric sensor includes a light projecting part that emits light, a light receiving part that receives light, a housing that houses the light projecting part and the light receiving part, a setting part that receives an input operation from outside to set a threshold value, an adjustment part that receives an input operation from outside to finely adjust the threshold value that has been set, and an indicator that displays a detection result of an object being detected. The housing includes a first surface having a light projecting/receiving surface allowing light from the light projecting part and light to the light receiving part to pass; a second surface located on a side opposite to the first surface; a third surface adjacent to the first surface and extending in a direction orthogonal to the first surface and the second surface; and an inclined surface inclined with respect to the third surface and the second surface and connecting the third surface and the second surface. The setting part and the indicator are provided on the third surface in order from the side of the inclined surface, and the adjustment part is provided on the inclined surface. A distance between the setting part and the adjustment part is larger than a distance between the setting part and the indicator.

DESCRIPTION OF THE EMBODIMENTS

Figure 1:
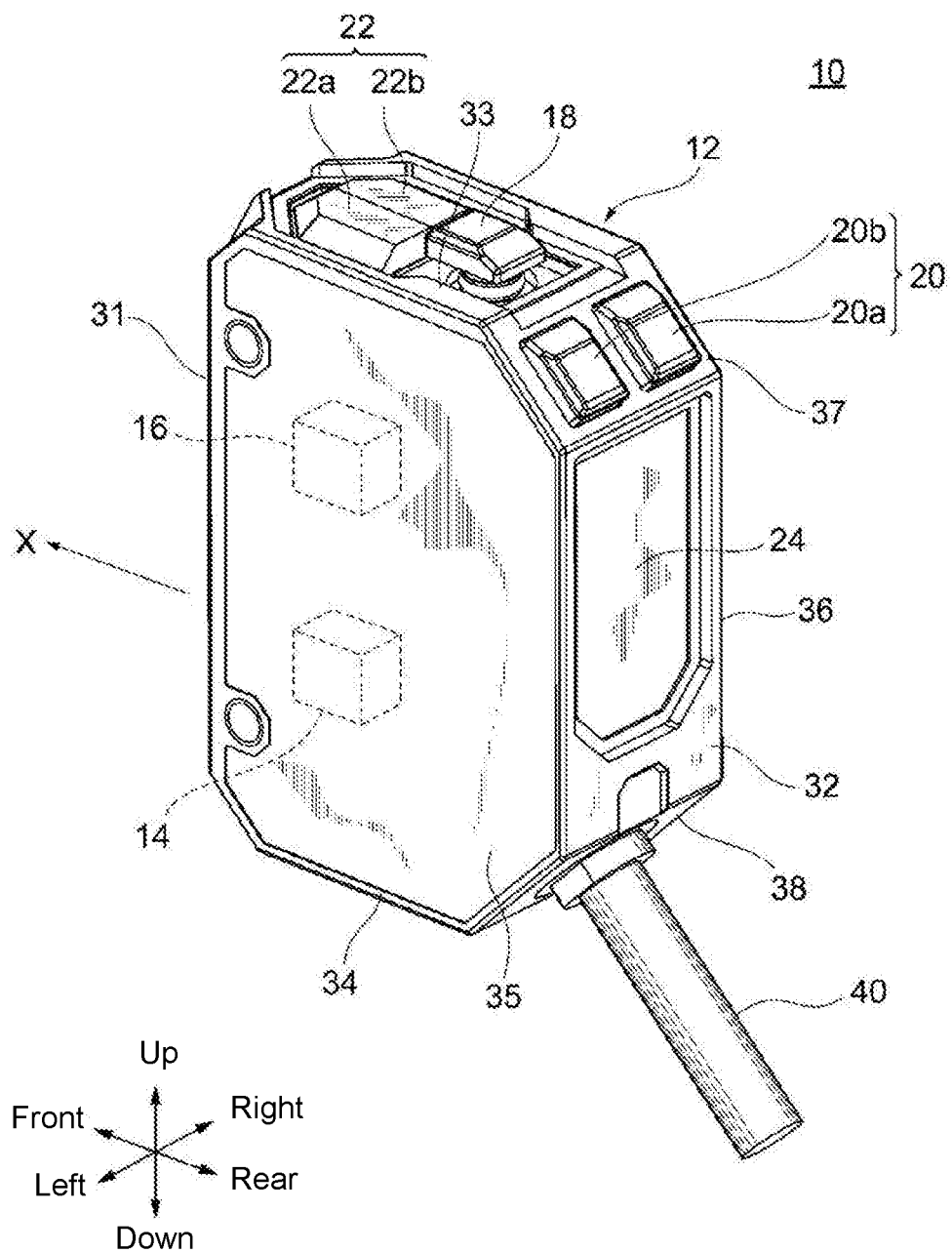
FIG. 1 is a perspective view of a photoelectric sensor according to an embodiment viewed from one direction and illustrates a state in which a sealing member is removed from a housing.

The disclosure provides a photoelectric sensor with improved operability and sealability.

According to an embodiment of the disclosure, a photoelectric sensor includes a light projecting part that emits light, a light receiving part that receives light, a housing that houses the light projecting part and the light receiving part, a setting part that receives an input operation from outside to set a threshold value, an adjustment part that receives an input operation from outside to finely adjust the threshold value that has been set, and an indicator that displays a detection result of an object being detected. The housing includes a first surface having a light projecting/receiving surface allowing light from the light projecting part and light to the light receiving part to pass; a second surface located on a side opposite to the first surface; a third surface adjacent to the first surface and extending in a direction orthogonal to the first surface and the second surface; and an inclined surface inclined with respect to the third surface and the second surface and connecting the third surface and the second surface. The setting part and the indicator are provided on the third surface in order from the side of the inclined surface, and the adjustment part is provided on the inclined surface. A distance between the setting part and the adjustment part is larger than a distance between the setting part and the indicator.

According to the embodiment, since the setting part, the adjustment part, and the indicator are provided using two surfaces, miniaturization of the photoelectric sensor is possible. In particular, the surface on which the setting part is provided and the surface on which the adjustment part is provided are adjacent to each other, and both surfaces are in an inclined relationship instead of a vertical relationship. Thus, operability of the setting part and the adjustment part can be improved while miniaturizing the photoelectric sensor. In addition, since the distances between the indicator, the setting part, and the adjustment part are set as described above, a relatively large area can be ensured between the setting part and the adjustment part. As such, the area can be effectively used for sealing, so that sealability can be easily ensured.

The photoelectric sensor further includes a sealing member attached to the housing to seal a periphery of the indicator and the setting part. At least one of the third surface and the inclined surface may have a part of an area sealed by the sealing member between the setting part and the adjustment part. According to the embodiment, the periphery of the indicator and the periphery of the setting part can be collectively sealed by the sealing member. At this time, a relatively large area between the setting part and the adjustment part can be used for sealing.

The third surface, out of the third surface and the inclined surface, may be sealed by the sealing member. According to the embodiment, since only one surface is sealed by the sealing member, higher sealability can be ensured.

The sealing member may have an inner surface facing the third surface and the inner surface of the sealing member may be welded to the third surface. According to the embodiment, the sealing member can be attached by welding to the third surface of the housing to seal the third surface.

A display part that displays the threshold value may be provided on the second surface. According to the embodiment, the display part can be provided near the adjustment part. According to the embodiment, for example, since the user can perform an input operation on the adjustment part while viewing the display of the display part, operability can be further improved. In addition, the surface on which the display part is provided is opposite to the light projecting/receiving surface. As a result, spaciousness of the display area of the display part and the area of the light projecting/receiving surface can be ensured while miniaturizing the housing as a whole using the inclined surface.

Operability and sealability of the photoelectric sensor can be improved.

Figure 2:
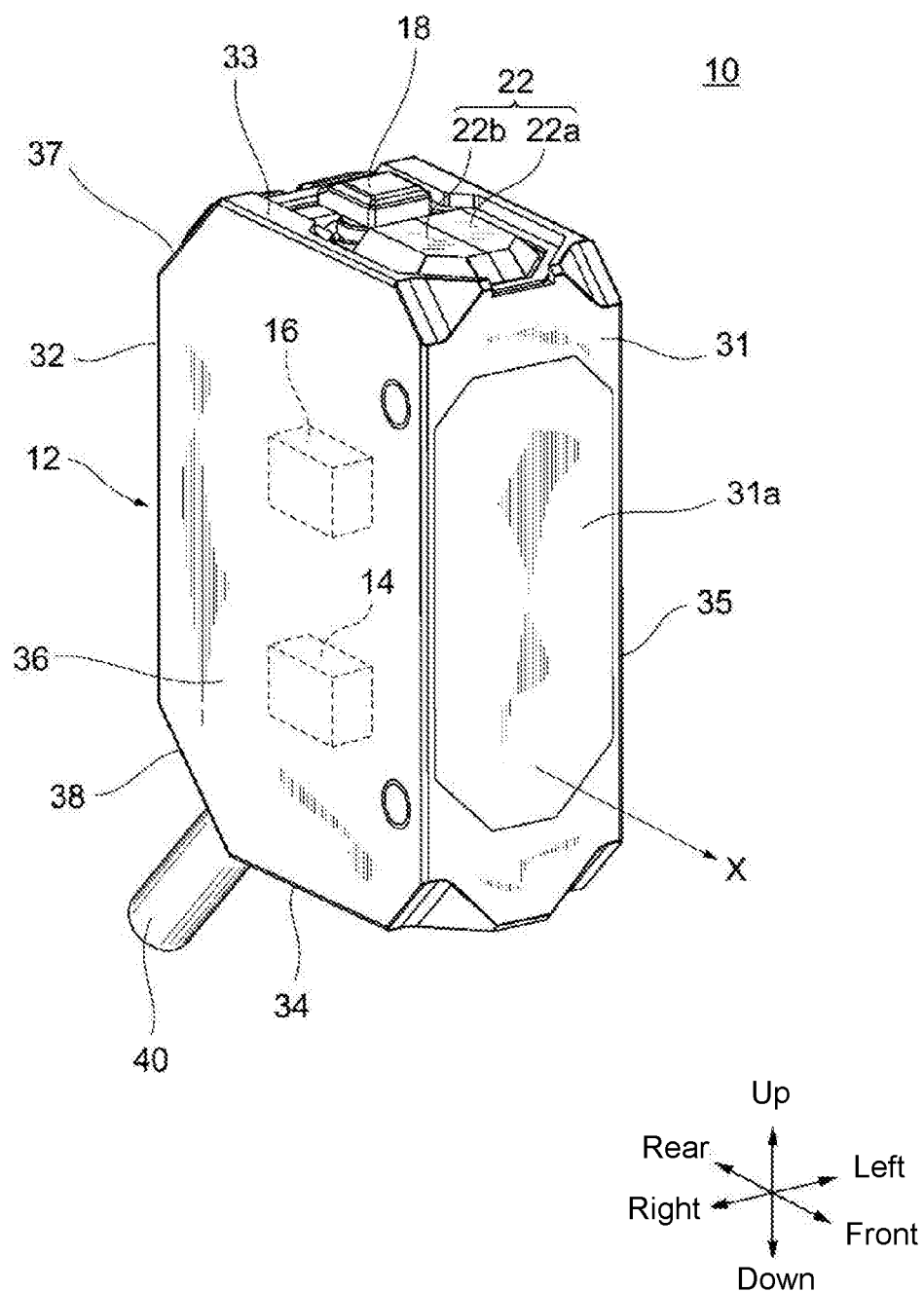
FIG. 2 is a perspective view of the photoelectric sensor of FIG. 1 viewed from another direction.

With reference to the accompanying drawings, a photoelectric sensor according to an exemplary embodiment of the disclosure will be described using a photoelectric sensor of range as an example. For convenience of explanation, references with respect to front, rear, left, right, top, and down, are made as shown in FIGS. 1 and 2. In each figure, parts denoted by the same reference numerals have the same or similar configurations.

As shown in FIGS. 1 and 2, a photoelectric sensor 10 has a housing 12. Inside the housing 12, a light projecting part 14 and a light receiving part 16 are accommodated. A teach button 18, an adjustment button 20, an indicator 22, and a display part 24 are provided on the outer surface of the housing 12.

The light projecting part 14 projects light to an object being detected, and has a light emitting element and a light projecting lens. The light emitting element is a laser diode for example with an optical axis X parallel to the front-rear direction. The light receiving part 16 receives the reflected light of the light projected to the object being detected and has a light receiving element and a light receiving lens. The light receiving element is, for example, a 2-division photodiode or a position detecting element. The principle of Time of Flight (TOF) or triangulation can be used, for example, as the detection principle of distance measurement for obtaining the distance to the object being detected. For example, when the principle of triangulation is used in the above configuration, the light emitted from the light emitting element is projected to the object being detected through the light projecting lens and the light reflected by the object being detected forms an image on the light receiving element through the light receiving lens. The light receiving element outputs two light receiving signals corresponding to the position of the formed image and transmits the signals to a control circuit via an amplifier. The amplifier and the control circuit are built in the photoelectric sensor 10. In the control circuit, the position signal value calculated from the two light receiving signals received is compared with a threshold value, and the distance to the object being detected is obtained.

The teach button 18 functions as a setting part for receiving an input operation from outside to set the threshold value. Here, the threshold value refers to a reference value for judging the presence or the absence of the object being detected or a distance to the object being detected in the photoelectric sensor 10, and is one of the sensitivity parameters for adjusting sensitivity. As the sensitivity parameters, in addition to the threshold value, the power of light emitted from the light projecting part 14, that is, the light projection intensity, and the amplification factor of the amount of light received by the light receiving part 16, that is, the gain, can be mentioned. For example, for detection of a transparent object with low reflectance, a high light projection intensity is set. When the user presses the teach button 18, a teaching process of setting the sensitivity parameter(s), including at least the threshold value, is performed and the sensitivity parameter(s), including at least the threshold value, is automatically set to a certain value. As the teaching process, there are for example, the 1-point teaching process and the 2-point teaching process. The details of the processes have been described in Patent Documents (for example, Japanese Laid-Open No. 2008-298614) and so on previously filed by the Applicant, so the descriptions thereof shall be omitted here.

The adjustment button 20 functions as an adjustment part for receiving an input operation from outside to finely adjust the threshold value set by the teach button 18. The adjustment button 20 has, for example, push type UP button 20*a* and DOWN button 20*b*. The UP button 20*a* and the DOWN button 20*b* are arranged side by side in the left-right direction. When the user presses the UP button 20*a*, the threshold value set by the teach button 18 changes one by one in an increasing direction, and when the user presses the DOWN button 20*b*, the threshold value changes one by one in a decreasing direction. Following the input operation from outside, the threshold value set by the teach button 18 is raised or lowered, and the threshold value to be used in the photoelectric sensor 10 is updated. Using the adjustment button 20, it is also possible to finely adjust other adjustable values apart from the threshold value. For example, it is possible to finely adjust brightness of the display part 24.

The indicator 22 is lit according to the power supply status or the detection condition of the photoelectric sensor 10. For example, the indicator 22 has a power light 22*a* and an operation indicator light 22*b*. The power light 22*a* and the operation indicator light 22*b* are arranged side by side in the left-right direction. The power light 22*a* is lit, for example, when the power is on. The operation indicator light 22b displays the detection result of the object being detected. For example, the operation indicator light 22b lights up when the object being detected is detected. The power light 22a and the operation indicator light 22b are each composed of an LED for example and are lit with different display colors. The display part 24 displays various kinds of information. For example, the display part 24 displays the threshold value set by the teach button 18, the threshold value at the time of making a fine adjustment by the adjustment button 20, a distance value up to the object being detected obtained by the photoelectric sensor 10, etc.

The housing 12 is made of resin or metal for example and has a substantially rectangular parallelepiped shape. The housing 12 has a front surface 31, a rear surface 32, a top surface 33, a bottom surface 34, a side surface 35, and a side surface 36 with respect to the six surfaces constituting the rectangular parallelepiped. The front surface 31 and the rear surface 32 are opposite to each other with the interior of the housing 12 interposed therebetween. Likewise, the top surface 33 and the bottom surface 34 are opposite to each other with the interior of the housing 12 interposed therebetween, and the side surface 35 and the side surface 36 are opposite to each other with the interior of the housing 12 interposed therebetween. The front surface 31 and the rear surface 32 are formed longer in the top-bottom direction than in the left-right direction. Similarly, the top surface 33 and the bottom surface 34 are formed longer in the front-rear direction than in the left-right direction, and the side surfaces 35 and 36 are formed longer in the top-bottom direction than in the front-rear direction. The front surface 31 has a light projecting/receiving surface 31a that allows light from the light projecting part 14 and light to the light receiving part 16 to pass. On the rear surface 32 located on the opposite side of the front surface 31, the display part 24 is provided. The top surface 33 is adjacent to the front surface 31 and extends in a direction orthogonal to the front surface 31 and the rear surface 32. On the top surface 33, the indicator 22 and the teach button 18 are provided in order from the side of the front surface 31. Specifically, the power light 22a and the operation indicator light 22b of the indicator 22 are arranged in the left-right direction on the top surface 33 with little or no gap. Also, the teach button 18 is arranged on the top surface 33 with a predetermined gap behind the power light 22a and the operation indicator light 22b.

The housing 12 has an inclined surface 37 and an inclined surface 38 at positions corresponding to two corners of the rectangular parallelepiped in addition to the six surfaces above. On the inclined surface 37, the adjustment button 20 is provided. More specifically, the UP button 20a and the DOWN button 20b of the adjustment button 20 are disposed on the inclined surface 37 with a predetermined gap in the left-right direction. A cord 40 is provided on the inclined surface 38. The cord 40 is used, for example, to send detection signals indicating the result detected by the photoelectric sensor 10 to the outside of the photoelectric sensor 10. The inclined surface 37 is inclined with respect to the rear surface 32 and the top surface 33 and connects the rear surface 32 and the top surface 33. Similarly, the inclined surface 38 is inclined with respect to the rear surface 32 and the bottom surface 34 and connects the two surfaces. The inclined surface 37 is smaller than the rear surface 32 and the top surface 33.

The "substantially rectangular parallelepiped shape" above with respect to the housing 12 does not mean a rectangular parallelepiped whose interior angles are all 90 degrees, but at least refers to a rectangular parallelepiped having one corner chamfered like the inclined surface 37.

Figure 3:
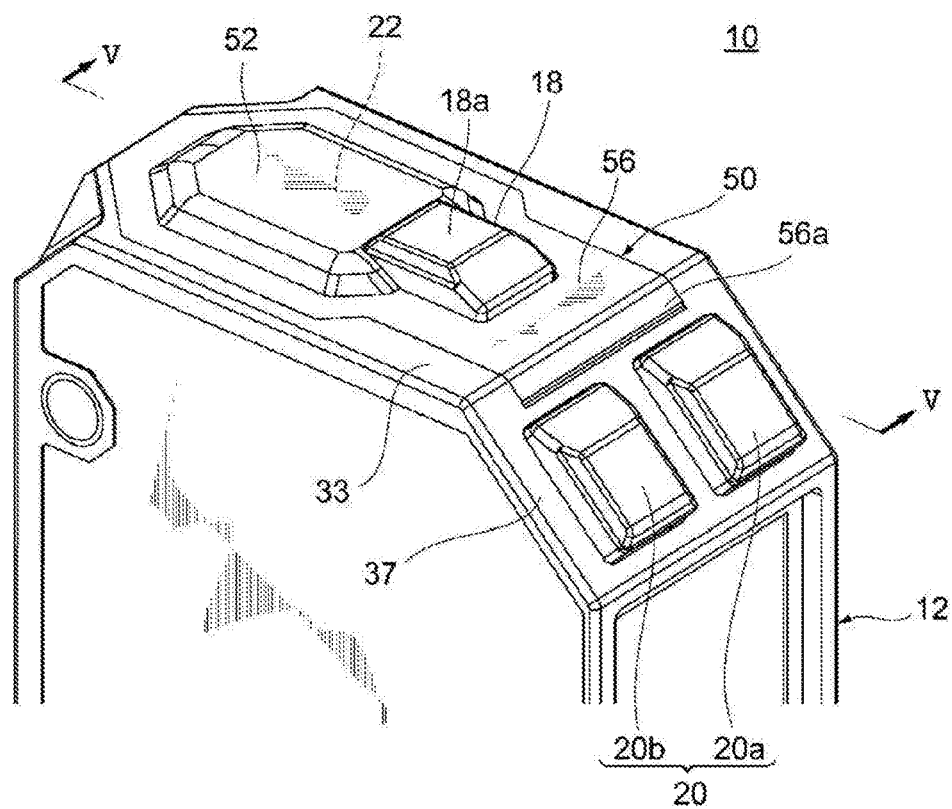
FIG. 3 is an enlarged perspective view around the top surface and the inclined surface of the photoelectric sensor of FIG. 1 and illustrates a state in which the sealing member is attached to the housing.
Figure 4:
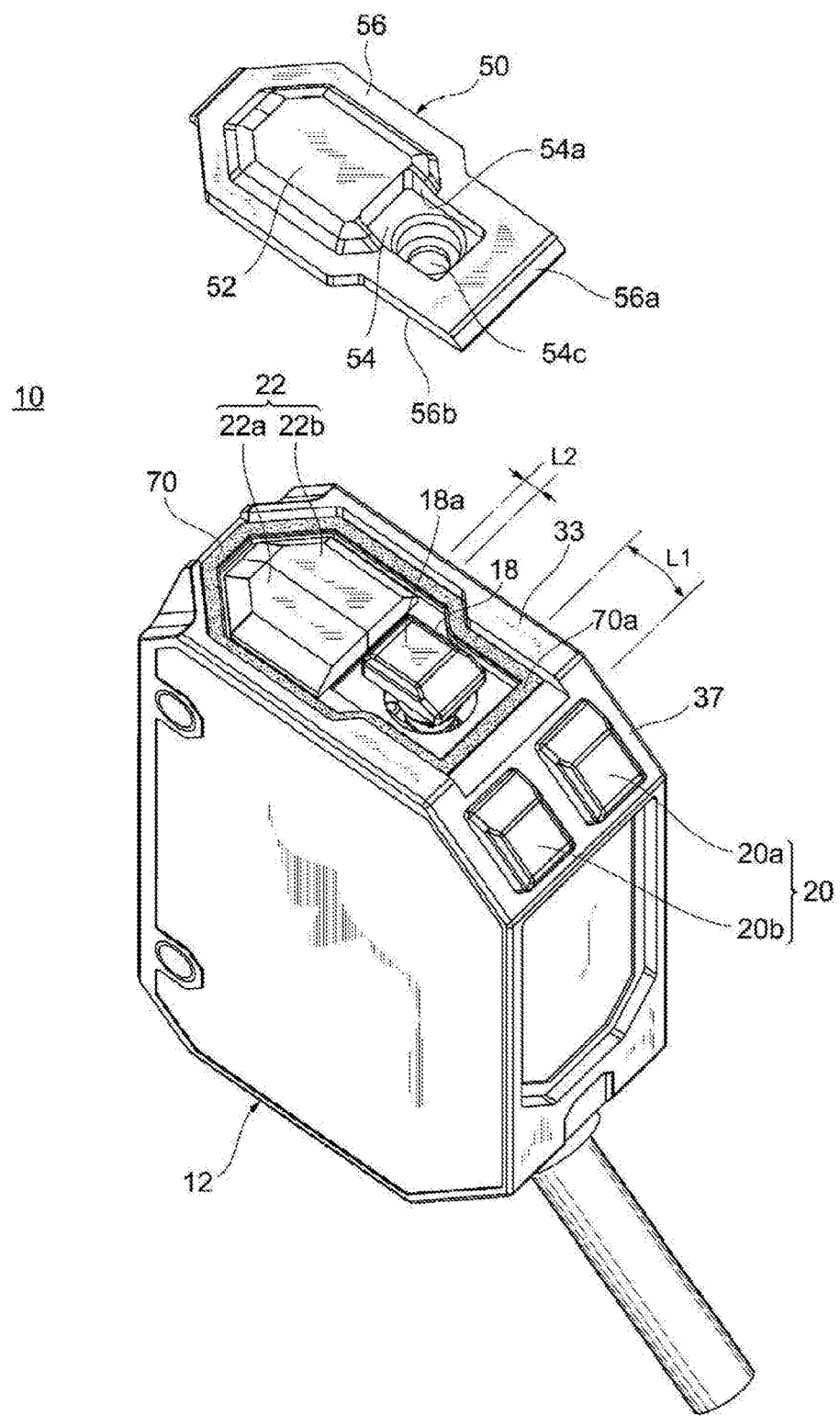
FIG. 4 is an exploded perspective view illustrating a state in which the sealing member is separated from the housing of the photoelectric sensor of FIG. 3.
Figure 5:
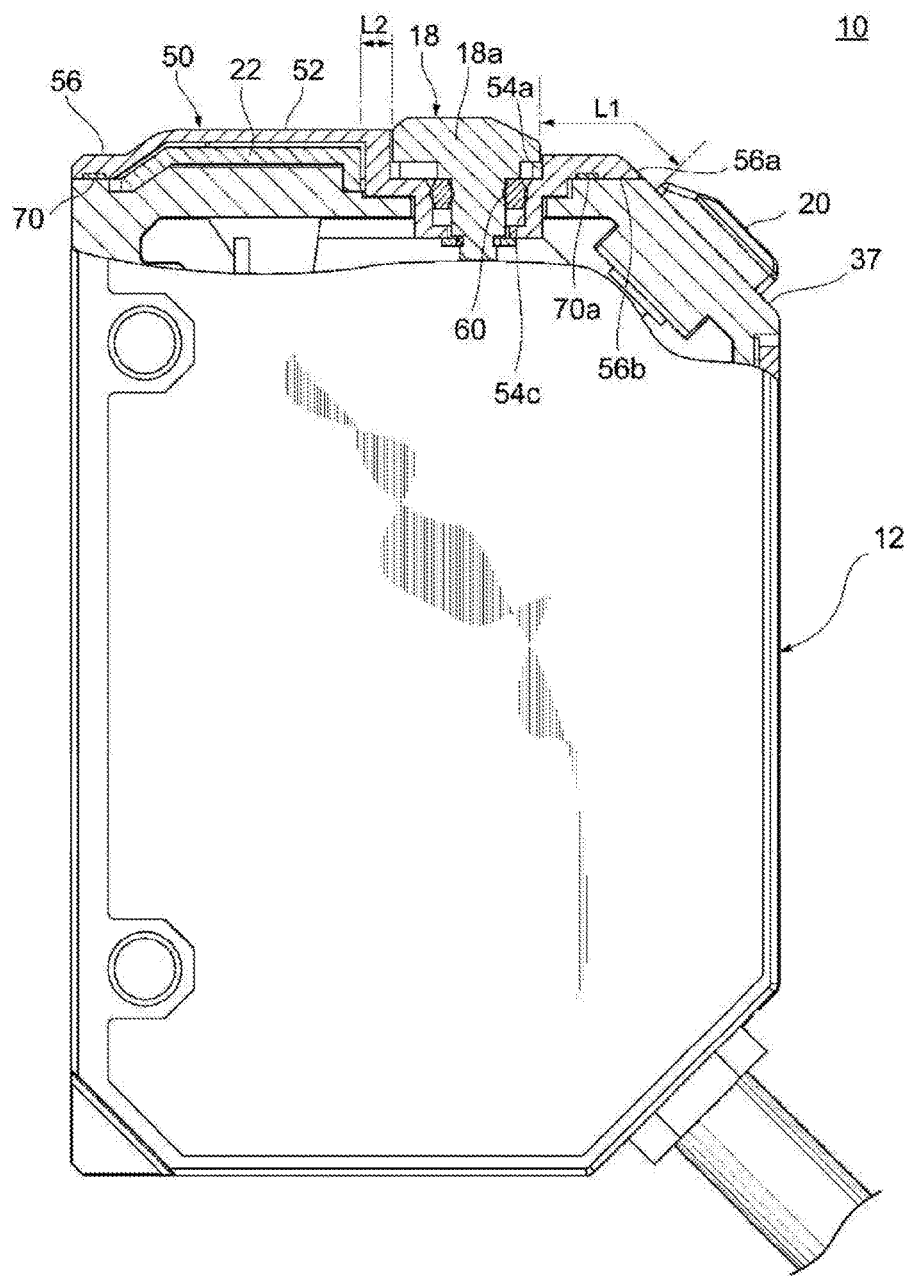
FIG. 5 is a cross-sectional view taken along the line V-V of FIG. 3.

As shown in FIGS. 3 to 5, the photoelectric sensor 10 has a sealing plate 50 attached to the housing 12. The sealing plate 50 serves as a sealing member for sealing the periphery of the indicator 22 and the teach button 18. The sealing plate 50 has a covering part 52 covering the indicator 22, a groove 54 accommodating the lower part of the teach button 18, and a peripheral part 56 surrounding the periphery of the covering part 52 and the groove 54. The whole or at least the covering part 52 of the sealing plate 50 is made transparent or translucent using resin. The covering part 52 is raised with respect to the peripheral part 56 and the indicator 22 is covered inside the covering part 52 so as to be visible through the covering part 52.

The groove 54 is recessed with respect to the peripheral part 56 and accommodates the lower part of the teach button 18 so as to expose a top part 18a of the teach button 18 to the outside. The groove 54 is formed corresponding to the outer shape of the teach button 18. An inner wall 54a of the groove 54 is configured to be able to guide the movement of the teach button 18 in the top-bottom direction. On the bottom wall of the groove 54, a through hole 54c, through which a shaft part 18b of the teach button 18 is inserted, is formed, and an O-ring 60 is provided between the through hole 54c and the shaft part 18b of the teach button 18. The peripheral part 56 has an inclined part 56a inclined corresponding to the inclined surface 37 at the end part on the side of the inclined surface 37. The inclined part 56a is positioned on the side of the top surface 33 with respect to the adjustment button 20. The peripheral part 56 also has an inner surface 56b facing the top surface 33.

With such configuration, the sealing plate 50 is attached to the top surface 33 and the inclined surface 37, so as to straddle the top surface 33 and the inclined surface 37. When the sealing plate 50 is attached, the inner surface 56b of the peripheral part 56 is welded to the top surface 33, so that the top surface 33 is sealed by the sealing plate 50. For the welding method, for example, a laser welding method or an ultrasonic welding method can be used. An area 70 on the top surface 33 that is welded (i.e., sealed) surrounds the periphery of the indicator 22 and the teach button 18, as shown in particular in FIG. 4. The area 70 includes an area 70a between the teach button 18 and the adjustment button 20. The area 70a extends in the left-right direction.

Here, as shown in FIGS. 4 and 5, the distance L1 between the teach button 18 and the adjustment button 20 is set to be larger than the distance L2 between the teach button 18 and the indicator 22. The distance L2, for example, means the length in the left-right direction from the side surface on the front side of the teach button 18 to the side surface on the rear side of the indicator 22. On the other hand, the distance L1, for example, means the length from the side surface on the rear side of the teach button 18 to the side surface on the side of the top surface 33 of the adjustment button 20, and this length means a length obtained by adding the length in the left-right direction from the side surface on the rear side of the teach button 18 to the intersection between the top surface 33 and the inclined surface 37 to the length in the inclination direction from the intersection to the side surface on the side of the top surface 33 of the adjustment button 20. The distance L1 can be, for example, 2-3 times of the distance L2.

The photoelectric sensor 10 according to the embodiment described above includes the light projecting part 14 that emits light, the light receiving part 16 that receives light, the housing 12 that houses the light projecting part 14 and the light receiving part 16, the teach button 18 for receiving an input operation from outside to set a threshold value, the adjustment button 20 for receiving an input operation from outside to finely adjust the threshold value, and the indicator 22 for displaying the detection result of the object being detected. The housing 12 includes the front surface 31 having the light projecting/receiving surface 31a for light from the light projecting part 14 and light to the light receiving part 16 to pass, the rear surface 32 located on the opposite side of the front surface 31, the top surface 33 adjacent to the front surface 31 and extending in a direction orthogonal to the front surface 31 and the rear surface 32, and the inclined surface 37 inclined with respect to the top surface 33 and the rear surface 32 and connecting the top surface 33 and the rear surface 32. On the top surface 33, the teach button 18 and the indicator 22 are provided in order from the side of the inclined surface 37, the adjustment button 20 is provided on the inclined surface 37, and the distance L1 between the teach button 18 and the adjustment button 20 is larger than the distance L2 between the teach button 18 and the indicator 22.

According to the embodiment, since the teach button 18, the adjustment button 20 and the indicator 22 are provided utilizing two of the surfaces of the housing 12, the photoelectric sensor 10 can be miniaturized. In particular, the top surface 33 on which the teach button 18 is provided and the inclined surface 37 on which the adjustment button 20 is provided are adjacent to each other, and both surfaces are not in a vertical relationship but in an inclined relationship. As such, the adjustment button 20 can be provided near the teach button 18. Moreover, operability of the teach button 18 and the adjustment button 20 during setting/adjustment of the threshold value can be improved.

In addition, since the distances between the indicator 22, the teach button 18, and the adjustment button 20 are set as described above (L1>L2), a relatively large area between the teach button 18 and the adjustment button 20 can be ensured. As such, the area can be effectively utilized for sealing. Specifically, since a relatively large area between the teach button 18 and the adjustment button 20 can be used as the area 70a for sealing, sealability can be easily ensured.

In particular, when the periphery of the indicator 22 and the teach button 18 is collectively sealed by the sealing plate 50 attached to the housing 12, the area 70a for sealing can be ensured in a relatively large area between the teach button 18 and the adjustment button 20. Moreover, the surface sealed by the sealing plate 50 is the top surface 33, out of the top surface 33 and the inclined surface 37. As a result, since the surface to be sealed is only one surface, higher sealability can be ensured.

Also, since the display part 24 for displaying the threshold value is provided on the rear surface 32, the display part 24 can be provided near the adjustment button 20. Thus, for example, the user can perform the input operation on the adjustment button 20 while viewing the display of the display part 24, so that operability can be further improved. In addition, the surface on which the display part 24 is provided is on the opposite side to the light projecting/receiving surface 31a. As a result, spaciousness of the display area of the display part 24 and the area of the light projecting/receiving surface 31a can be ensured while miniaturizing the housing 12 as a whole using the inclined surface 37.

The embodiments described above are intended to facilitate understanding of the disclosure and shall not be construed as limitations to the disclosure. The elements included in the embodiments and their arrangements, materials, conditions, shapes, sizes, and the like are not limited to those exemplified and can be appropriately changed.

For example, the display part 24 may be provided on the top surface 33, so as to be positioned on the side of the front surface 31 with respect to the indicator 22. Also, the direction of side-by-side arrangement of the UP button 20a and the DOWN button 20b of the adjustment button 20 can be set in the top-bottom direction or the oblique direction. Furthermore, the adjustment button 20 may be composed of one button. In addition, although the adjustment button 20 of the push type is illustrated as an example for the adjustment part, the disclosure is not limited thereto and another type of the adjustment part such as a seesaw type, a volume dial type, a trimmer type, a jog dial type or the like can also be adopted.

The inclination angle of the inclined surface 37 can be appropriately designed in consideration of ease of performing the input operation on the adjustment button 20, miniaturization of the housing 12, ensuring the area of the rear surface 32 and the top surface 33, and the like.

In addition, although the chamfered region formed by chamfering the corner of the substantially rectangular parallelepiped shape of the housing 12 is constituted by the planar inclined surface 37, the disclosure is not limited thereto and the chamfered region may be constituted by a curved surface. That is, the chamfer form for forming the chamfered region is not limited to C chamfer (plane chamfer) that forms the inclined surface 37, and may be R chamfer (round chamfer) that forms a curved surface or reverse R chamfer (which is opposite to the direction of R chamfer. The surface of such chamfer may be referred to as a spoon surface or a lottery surface.). The adjustment part may be provided in the chamfered region of such a curved surface, so as to connect the rear surface 32 and the top surface 33. In addition, the chamfered region may be formed from a combination of multiple surfaces.

APPENDIX

1. A photoelectric sensor 10, including a light projecting part 14 that emits light, a light receiving part 16 that receives light, a housing 12 that houses the light projecting part 14 and the light receiving part 16, a teach button 18 part that receives an input operation from outside to set a threshold value, an adjustment button 20 that receives an input operation from outside to finely adjust the threshold value that has been set, and an indicator 22 that displays a detection result of an object being detected, wherein the housing 12 includes:

a front surface 31 having a light projecting/receiving surface 31a allowing light from the light projecting part 14 and light to the light receiving part 16 to pass;

a rear surface 32 located on a side opposite to the front surface 31;

a top surface 33 adjacent to the front surface 31 and extending in a direction orthogonal to the front surface 31 and the rear surface 32; and an inclined surface 37 inclined with respect to the top surface 33 and the rear surface 32 and connecting the top surface 33 and the rear surface 32, wherein the teach button 18 and the indicator 22 are provided on the top surface 33 in order from the side of the inclined surface 37, and the adjustable button 20 is provided on the inclined surface 37, and a distance L1 between the teach button 18 and the adjustment button 20 is larger than a distance L2 between the teach button 18 and the indicator 22.

What is claimed is:

1. A photoelectric sensor, comprising a light projecting part that emits light, a light receiving part that receives light, a housing that houses the light projecting part and the light receiving part, a setting part that receives an input operation from outside to set a threshold value, an adjustment part that receives an input operation from outside to finely adjust the threshold value that has been set, and an indicator that displays a detection result of an object being detected, wherein the housing comprises:
a first surface having a light projecting/receiving surface allowing light from the light projecting part and light to the light receiving part to pass;
a second surface located on a side opposite to the first surface;
a third surface adjacent to the first surface and extending in a direction orthogonal to the first surface and the second surface; and
an inclined surface inclined with respect to the third surface and the second surface and connecting the third surface and the second surface, wherein
the setting part and the indicator are provided on the third surface in order from the side of the inclined surface, and
the adjustment part is provided on the inclined surface, and
a distance between the setting part and the adjustment part is larger than a distance between the setting part and the indicator.

2. The photoelectric sensor according to claim 1, further comprising a sealing member attached to the housing to seal a periphery of the indicator and the setting part, wherein
at least one of the third surface and the inclined surface has a part of an area sealed by the sealing member between the setting part and the adjustment part.

3. The photoelectric sensor according to claim 2, wherein the third surface, out of the third surface and the inclined surface, is sealed by the sealing member.

4. The photoelectric sensor according to claim 3, wherein the sealing member has an inner surface facing the third surface, and the inner surface of the sealing member is welded to the third surface.

5. The photoelectric sensor according to claim 4, wherein a display part that displays the threshold value is provided on the second surface.

6. The photoelectric sensor according to claim 3, wherein a display part that displays the threshold value is provided on the second surface.

7. The photoelectric sensor according to claim 2, wherein a display part that displays the threshold value is provided on the second surface.

8. The photoelectric sensor according to claim 1, wherein a display part that displays the threshold value is provided on the second surface.

* * * * *